United States Patent
Yamaguchi

(10) Patent No.: US 11,862,445 B2
(45) Date of Patent: Jan. 2, 2024

(54) IMAGING MASS SPECTROMETER

(71) Applicant: SHIMADZU CORPORATION, Kyoto-shi (JP)

(72) Inventor: Shinichi Yamaguchi, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 218 days.

(21) Appl. No.: 17/312,502

(22) PCT Filed: Feb. 14, 2019

(86) PCT No.: PCT/JP2019/005366
§ 371 (c)(1),
(2) Date: Jun. 10, 2021

(87) PCT Pub. No.: WO2020/166007
PCT Pub. Date: Aug. 20, 2020

(65) Prior Publication Data
US 2022/0051884 A1  Feb. 17, 2022

(51) Int. Cl.
*H01J 49/00* (2006.01)
(52) U.S. Cl.
CPC ...... *H01J 49/0004* (2013.01); *H01J 49/0036* (2013.01)
(58) Field of Classification Search
CPC .............. H01J 49/0004; H01J 49/0036; H01J 49/0027; G01N 21/65
(Continued)

(56) References Cited

U.S. PATENT DOCUMENTS

2014/0316717 A1* 10/2014 Ikegami .............. H01J 49/0004
702/23
2017/0352525 A1* 12/2017 Ikegami .............. G06V 20/695
(Continued)

FOREIGN PATENT DOCUMENTS

CN  104112643 A  10/2014
CN  107850567 A  3/2018
(Continued)

OTHER PUBLICATIONS

"Software: rich statistical analysis function and simple operability—Imaging MS Solution—", [online], Shimadzu Corporation, [searched on Nov. 26, 2018], Internet.
(Continued)

*Primary Examiner* — Michael Maskell
(74) *Attorney, Agent, or Firm* — Sughrue Mion, PLLC

(57) ABSTRACT

An imaging mass spectrometer includes: a storage configured to acquire and store data constituting a first imaging graphic indicating an ion intensity distribution in a specific one or plurality of m/z or m/z ranges based on data obtained by mass spectrometry for a sample; a Raman imaging data acquisition unit configured to acquire and store data constituting one or plurality of second imaging graphics obtained by Raman analysis that is a type different from mass spectrometry for the sample; a signal intensity normalization processor configured to perform data conversion processing of normalizing signal intensity in one or plurality of first and second imaging graphics; an adjustment processor configured to perform data processing of aligning spatial resolutions of the one or plurality of first and second imaging graphics; and a statistical analysis processor configured to execute statistical analysis processing on images and to classify the first and second imaging graphics.

6 Claims, 3 Drawing Sheets

(58) Field of Classification Search
USPC .................................................. 250/281, 282
See application file for complete search history.

(56) References Cited

U.S. PATENT DOCUMENTS

| | | | |
|---|---|---|---|
| 2018/0197726 A1* | 7/2018 | Yamaguchi | ............... G06T 7/97 |
| 2019/0221409 A1 | 7/2019 | Takeshita | |
| 2019/0272984 A1 | 9/2019 | Takeshita | |

FOREIGN PATENT DOCUMENTS

| | | |
|---|---|---|
| EP | 2 797 104 A2 | 10/2014 |
| EP | 3 239 704 A1 | 11/2017 |
| EP | 3 318 866 A1 | 5/2018 |
| JP | 2014-215043 A | 11/2014 |
| WO | 2016/103312 A1 | 6/2016 |
| WO | 2017/002226 A1 | 1/2017 |
| WO | 2017/195271 A1 | 11/2017 |
| WO | 2018/037491 A1 | 3/2018 |

OTHER PUBLICATIONS

International Search Report for PCT/JP2019/005366 dated May 7, 2019 (PCT/ISA/210).
Written Opinion for PCT/JP2019/005366 dated May 7, 2019 (PCT/ISA/237).

* cited by examiner

IMAGING MASS SPECTROMETER

CROSS REFERENCE TO RELATED APPLICATIONS

This application is a National Stage of International Application No. PCT/JP2019/005366 filed Feb. 14, 2019.

TECHNICAL FIELD

The present invention relates to an imaging mass spectrometer capable of executing mass spectrometry on each of a large number of measurement points (micro areas) in a two-dimensional region on a sample or in a three-dimensional region in a sample to collect mass spectrometry imaging data.

BACKGROUND ART

In an imaging mass spectrometer, mass spectrometry is executed for a large number of measurement points (micro areas) set in a predetermined two-dimensional measurement region on the surface of a sample such as a biological tissue section, and mass spectrum data can be acquired for each measurement point. Then, on the basis of the data thus acquired, a mass spectrometry imaging graphic (hereinafter, referred to as an MS imaging graphic), which is a two-dimensional intensity distribution of ions at various mass-to-charge ratios m/z, can be created and presented to a user.

In data analysis of the imaging mass spectrometer, it is important to find a plurality of MS imaging graphics having similar spatial ion intensity distributions. This is because different components having similar intensity distribution patterns are likely to be components exhibiting the same or similar dynamics or closely related.

Non Patent Literature 1 discloses software for performing various analysis processing in imaging mass spectrometry. This software has a function of collecting and clustering images having similar two-dimensional intensity distributions using hierarchical cluster analysis (HCA), which is a method of statistical analysis. By utilizing this function, it is possible to find a plurality of mass-to-charge ratios having similar intensity distribution patterns or to find another component exhibiting a distribution close to a certain component.

CITATION LIST

Patent Literature

Patent Literature 1: WO 2018/037491 A

Non Patent Literature

Non Patent Literature 1: "Software: rich statistical analysis function and simple operability-Imaging MS Solution-", [online], Shimadzu Corporation, [searched on Nov. 26, 2018], Internet

SUMMARY OF INVENTION

Technical Problem

Recently, imaging by various analysis methods such as infrared spectroscopic analysis, Raman spectroscopic analysis, and fluorescence analysis as well as mass spectrometry has been attempted. By using a plurality of different analysis methods in combination, there is an advantage that a component that cannot be detected by a certain analysis can be detected, or accuracy of an analysis result, which is low by a certain analysis, can be improved. However, comparison between imaging graphics obtained by different analysis methods and determination of similarity are solely dependent on manual work of the person in charge of analysis, and there is a problem in objectivity of comparison and determination. In addition, the work efficiency of the analysis is also poor, and such imaging is unsuitable for processing a large amount of analysis results.

The present invention has been made to solve the above problems, and a main object thereof is to provide an imaging mass spectrometer capable of efficiently and objectively executing analysis processing based on a plurality of imaging graphics obtained by different analysis methods for the same sample and providing useful information on the sample to a person in charge of analysis.

Solution to Problem

According to an aspect of the present invention made to solve the above problems, there is provided an imaging mass spectrometer that executes mass spectrometry on each of a plurality of micro areas set in a two-dimensional measurement region on a sample or a three-dimensional measurement region in a sample, the imaging mass spectrometer including:
  a first imaging graphic data acquisition section configured to acquire data constituting one or a plurality of first imaging graphics indicating an ion intensity distribution at one or a plurality of specific mass-to-charge ratios or in one or a plurality of mass-to-charge ratio ranges or indicating a distribution of a calculation result obtained by predetermined calculation processing based on the ion intensity distribution based on data obtained by mass spectrometry for a target sample;
  a second imaging graphic data acquisition section configured to acquire data constituting one or a plurality of second imaging graphics obtained by an analysis method that is a type different from the mass spectrometry with respect to the target sample;
  a first data processor configured to perform, on data acquired by the first imaging graphic data acquisition section and the second imaging graphic data acquisition section, data conversion processing of normalizing signal intensity in the one or plurality of first imaging graphics and signal intensity in the one or plurality of second imaging graphics;
  a second data processor configured to perform, on data acquired by the first imaging graphic data acquisition section and the second imaging graphic data acquisition section, data processing of aligning spatial resolutions of the one or plurality of first imaging graphics and the one or plurality of second imaging graphics; and
  an image classification processor configured to execute statistical analysis processing on an image for data after processing by the first and second data processor and to classify the one or plurality of first imaging graphics and the one or plurality of second imaging graphics on a basis of similarity or difference in spatial distribution.

Here, it is a matter of course that the "analysis method that is a type different from the mass spectrometry" includes an analysis method having a principle different from that of the mass spectrometry, for example, infrared spectroscopic analysis, Raman spectroscopic analysis, fluorescence analysis, X-ray analysis, and the like. In addition, mass spectrometry in which types of ions to be analyzed are different even in mass spectrometry for the same sample is assumed to be an "analysis method that is a type different from the mass spectrometry". Therefore, for example, when the data constituting the first imaging graphic is data obtained by normal mass spectrometry, MS/MS analysis and MS$^n$ analysis accompanied by ion dissociation operation are each an "analysis method of a type different from the mass spectrometry". In addition, even if the sample to be analyzed itself is the same, the generated ion species may be different when the ionization method at the time of mass spectrometry is different. Therefore, here, mass spectrometry with a different ionization method is also a different type of analysis method. For example, mass spectrometry using a matrix-assisted laser desorption ionization (MALDI) method and mass spectrometry using an ionization method in a secondary ion mass spectrometry (SIMS) method are different types of analysis methods.

Advantageous Effects of Invention

According to the imaging mass spectrometer of the present invention, analysis processing based on a plurality of imaging graphics obtained by mass spectrometry and one or a plurality of analysis methods different from the mass spectrometry on the same sample is efficiently and objectively executed, and, for example, a plurality of components exhibiting similar intensity distributions can be easily found on imaging graphics obtained by different analysis methods. Such analysis processing makes it possible to provide the person in charge of analysis with useful information on the target sample, which cannot be obtained only by the mass spectrometry imaging method. As a result, it becomes easy to obtain new knowledge about the target sample.

DESCRIPTION OF EMBODIMENTS

Hereinafter, an imaging mass spectrometer according to an embodiment of the present invention will be described with reference to the accompanying drawings.

Figure 1:
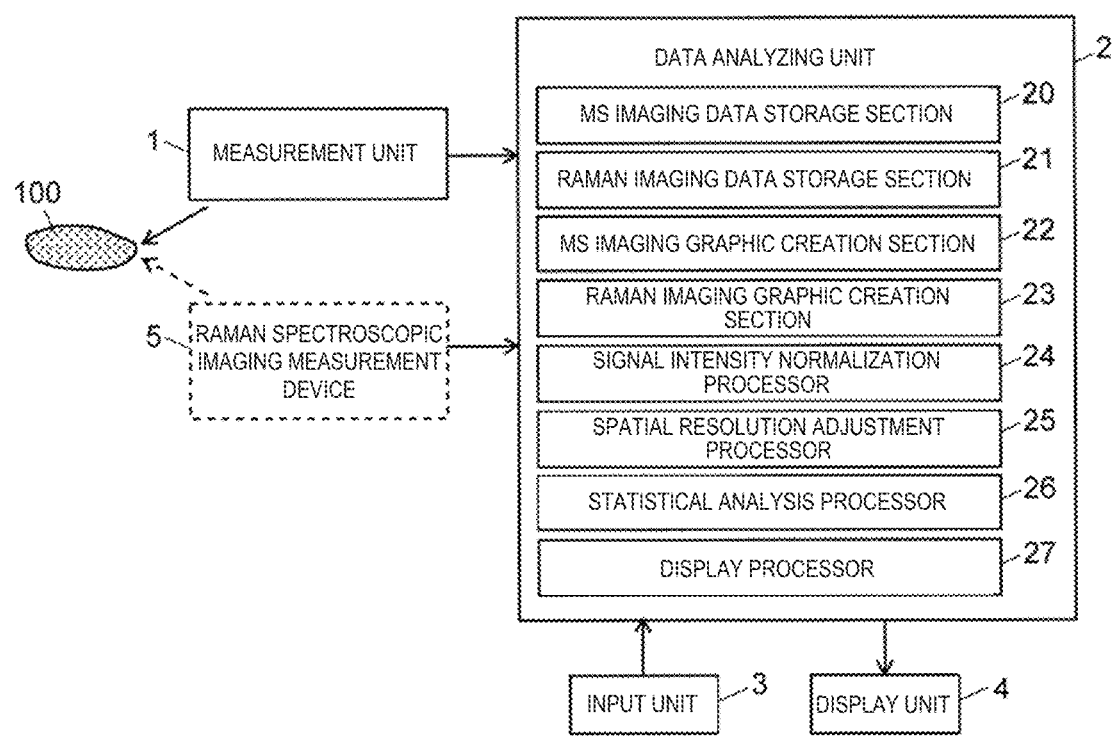
FIG. 1 is a schematic configuration diagram of an imaging mass spectrometer according to an embodiment of the present invention.

FIG. 1 is a schematic block configuration diagram of the imaging mass spectrometer of the present embodiment.

The imaging mass spectrometer of the present embodiment includes a measurement unit 1, a data analyzing unit 2, an input unit 3, and a display unit 4. In addition, a Raman spectroscopic imaging measurement device 5 is illustrated as a device, which is different from the measurement unit 1, for acquiring data to be processed by the data analyzing unit 2 although not a component of the imaging mass spectrometer.

The measurement unit 1 executes imaging mass spectrometry on a sample 100, and is a mass spectrometer obtained by combining an atmospheric pressure matrix-assisted laser desorption ionization (AP-MALDI) method for irradiating the sample with laser light under an atmospheric pressure atmosphere to ionize a substance in the sample and an ion-trap time-of-flight mass spectrometer (IT-TOFMS), for example, as disclosed in Patent Literature 1 and the like. In the measurement unit 1, for example, by scanning a position irradiated with laser light for ionization in a two-dimensional region on the sample 100 such as a biological tissue section, mass spectrometry can be performed for a large number of measurement points (substantially micro areas) in the two-dimensional region.

On the other hand, the Raman spectroscopic imaging measurement device 5 executes Raman spectroscopic analysis for each of a large number of measurement points set in a two-dimensional region on the same sample 100 as that subjected to imaging mass spectrometry to obtain a spectrum of Raman light by the sample 100.

The data analyzing unit 2 receives mass spectrometry data for each measurement point (micro area) obtained by the measurement unit 1 and spectrum data obtained by the Raman spectroscopic imaging measurement device 5, and performs analysis processing based on these data. In order to perform characteristic analysis processing described later, the data analyzing unit 2 includes, as functional blocks, an MS imaging data storage section 20, a Raman imaging data storage section 21, an MS imaging graphic creation section 22, a Raman imaging graphic creation section 23, a signal intensity normalization processor 24, a spatial resolution adjustment processor 25, a statistical analysis processor 26, and a display processor 27.

Although the data analyzing unit 2 can be configured by a hardware circuit, the data analyzing unit 2 is generally a computer such as a personal computer or a high-performance workstation. Each of the functional blocks can be embodied by executing dedicated data analysis software installed in the computer on the computer. In this case, the input unit 3 is a keyboard or a pointing device (such as a mouse) attached to the computer, and the display unit 4 is a display monitor.

Next, an example of characteristic operation in the imaging mass spectrometer of the present embodiment will be described with reference to FIG. 2.

The measurement unit 1 executes scan measurement over a predetermined mass-to-charge ratio m/z range for each of a large number of measurement points set in a measurement region having a predetermined size on the sample 100 such as a biological tissue section to acquire mass spectrum data. The obtained data is transferred from the measurement unit 1 to the data analyzing unit 2 and stored in the MS imaging data storage section 20. Separately from this, the Raman spectroscopic imaging measurement device 5 executes Raman spectroscopic analysis for each predetermined wavelength band (Raman band) for a large number of measurement points set in a two-dimensional region including the measurement region on the same sample 100 to acquire Raman spectrum data indicating the relationship between the scattering intensity and the wavelength. The obtained data is input from the Raman spectroscopic imaging measurement device 5 to the data analyzing unit 2, and the data analyzing unit 2 stores the input data in the Raman imaging data storage section 21.

When a user performs a predetermined operation on the input unit 3, the data analyzing unit 2 executes the following analysis processing using the data stored in each of the MS imaging data storage section 20 and the Raman imaging data storage section 21 as described above.

Figure 2:
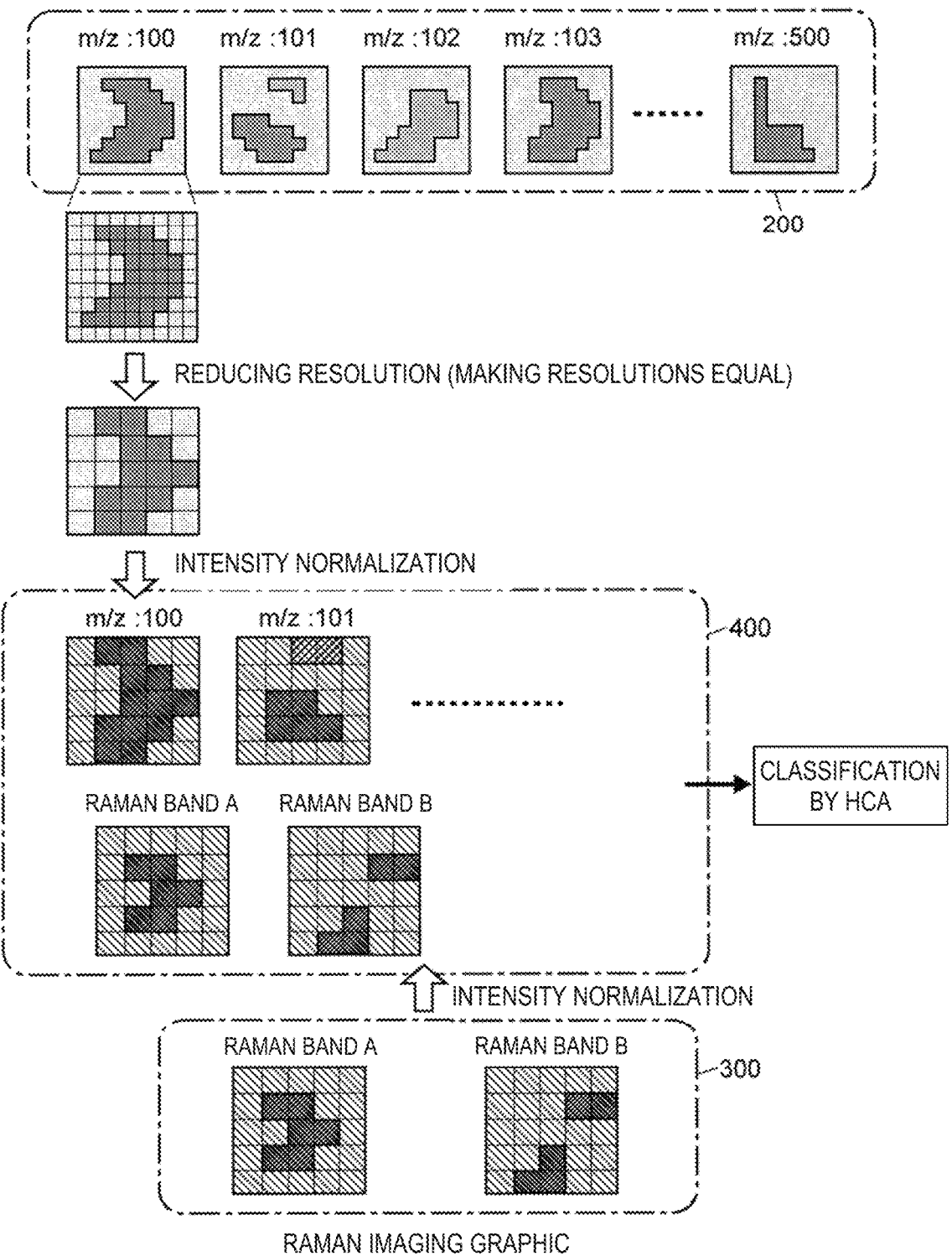
FIG. 2 is an explanatory diagram of an example of analysis processing in the imaging mass spectrometer of the present embodiment.

The MS imaging graphic creation section 22 reads, for example, ion intensity data at intervals of 1 Da for each measurement point from the MS imaging data storage section 20, and creates a large number of MS imaging graphics indicating the two-dimensional distribution of the ion intensity for each 1 Da (see reference numeral 200 in FIG. 2). In addition, the Raman imaging graphic creation section 23 reads the scattering intensity data for each Raman band from the Raman imaging data storage section 21, calculates, for example, a peak area for each Raman band, and uses the peak area as the scattering intensity to create one or a plurality of Raman imaging graphics indicating a two-dimensional distribution of the scattering intensity (see reference numeral 300 in FIG. 2).

As described above, the MS imaging graphic is an image indicating a two-dimensional distribution of the ion intensity for each mass-to-charge ratio, and the Raman imaging graphic is an image indicating a two-dimensional distribution of the scattering intensity for each Raman band. The MS imaging graphic and the Raman imaging graphic are analysis result images for (or including) the same measurement region of the same sample 100, but generally have different spatial resolutions (resolutions) from each other. In addition, the MS imaging graphic and the Raman imaging graphic are completely different in the level of the value of the signal intensity at each measurement point, and thus the comparison of the two-dimensional distributions as they are is meaningless. Therefore, in order to compare or treat the MS imaging graphic and the Raman imaging graphic equally, two processes including a process of aligning the dynamic ranges of the signal intensity and a process of aligning the spatial resolutions are executed.

Specifically, the signal intensity normalization processor 24 normalizes the ion intensity value of each measurement point and the scattering intensity value of each measurement point so that the maximum value of the ion intensity value in the MS imaging graphic and the maximum value of the scattering intensity value in the Raman imaging graphic become the same value (for example, the maximum value of the pixel value when the value of one data is expressed by an image). It is not necessary to normalize the intensity values between different MS imaging graphics or between different Raman imaging graphics (the normalization may be performed), and it is only required to normalize the ion intensities in all the MS imaging graphics and the scattering intensities in all the Raman imaging graphics.

In addition, the spatial resolution adjustment processor 25 aligns the spatial resolutions by reducing the spatial resolution of the image having the higher spatial resolution by binning processing or the like, or conversely, by increasing the spatial resolution of the image having the lower spatial resolution by interpolation processing or the like, between the MS imaging graphic and the Raman imaging graphic.

In the example illustrated in FIG. 2, the spatial resolution of the MS imaging graphic is higher than that of the Raman imaging graphic, and the spatial resolution of the MS imaging graphic and the spatial resolution of the Raman imaging graphic are aligned by reducing the spatial resolution of the MS imaging graphic. The intensity values of the MS imaging graphic and the Raman imaging graphic with the aligned spatial resolutions are normalized.

When the target measurement regions on the sample 100 in the imaging mass spectrometry and the Raman spectroscopic imaging are not completely the same, only the image corresponding to the region where both the measurement regions overlap may be cut out. Furthermore, in a case where distortion or deformation occurs in the acquired image due to the principle or characteristics of analysis or measurement, image processing for correcting such distortion or deformation may be performed.

By the series of processing described above, the MS imaging graphic and the Raman imaging graphic become two-dimensional distribution images that can be handled equally although the analysis methods used are different. Therefore, the statistical analysis processor 26 executes hierarchical cluster analysis by collecting the MS imaging graphics and the Raman imaging graphics after such processing, and performs clustering by collecting images having similar two-dimensional intensity distributions. As a result, the MS imaging graphic and the Raman imaging graphic in which the ionic intensity distribution pattern and the Raman scattering intensity distribution pattern are similar to each other are classified into the same cluster. That is, regardless of the difference in the analysis method, two-dimensional distributions of information obtained for the same measurement region of the same sample are classified into the same cluster when the distributions are similar, and classified into different clusters when the distributions are different.

Figure 3:
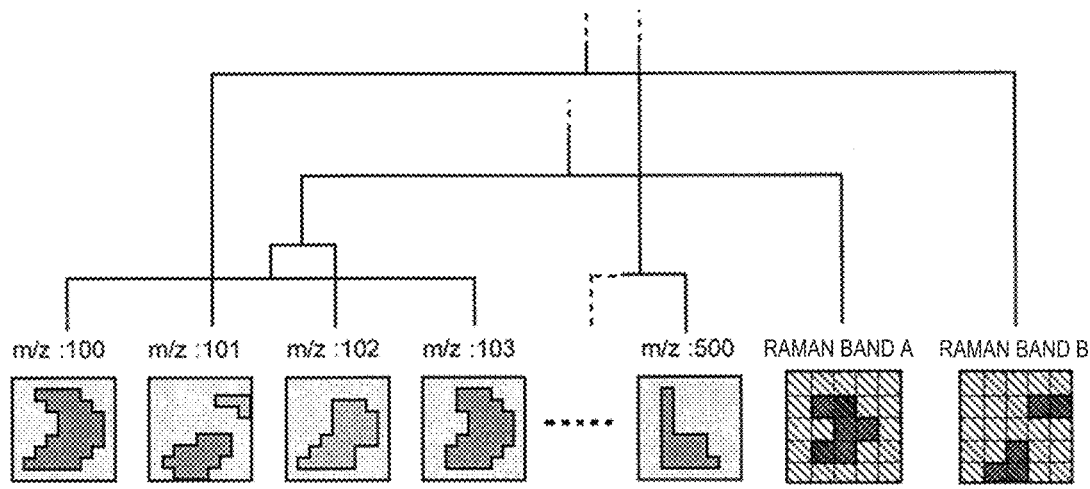
FIG. 3 is a diagram illustrating a display example of an analysis result in the imaging mass spectrometer of the present embodiment.

The display processor 27 displays the result of the hierarchical cluster analysis on the screen of the display unit 4 in a predetermined form. This display form can be selected from, for example, various predetermined forms. Specifically, reduced images of one or a plurality of imaging graphics classified into the same cluster can be collectively displayed in a list for each cluster, or reduced images of representative imaging graphics can be displayed in a list one by one for each cluster, or when the user instructs one of the imaging graphics by a click operation or the like, imaging graphics included in the same cluster as the instructed imaging graphic can be displayed in a list. In addition, in the hierarchical cluster analysis, a dendrogram showing similarity between imaging graphics can be created, and such a dendrogram may be displayed (see FIG. 3). In addition, similarity between the imaging graphics may be visually expressed using a scatter diagram.

In the imaging graphic, the two-dimensional intensity distribution is drawn using the gray scale or the color scale, and the display modes of the MS imaging graphic and the Raman imaging graphic may be easily distinguishable from each other so that the MS imaging graphic and the Raman imaging graphic can be recognized at a glance on the image indicating the classification result. For example, the display color may be different, the brightness of the display may be different, or the shape (for example, a frame may be attached to one side) and size of the display may be different.

The device of the above embodiment is a device that uses the two-dimensional region on the sample as the measurement region, that is, the MS imaging graphic or the Raman imaging graphic is a two-dimensional image, but the device can also be a device that processes a three-dimensional MS imaging graphic or Raman imaging graphic using a three-dimensional region in the sample as a measurement region.

Figures 4A, 4B:
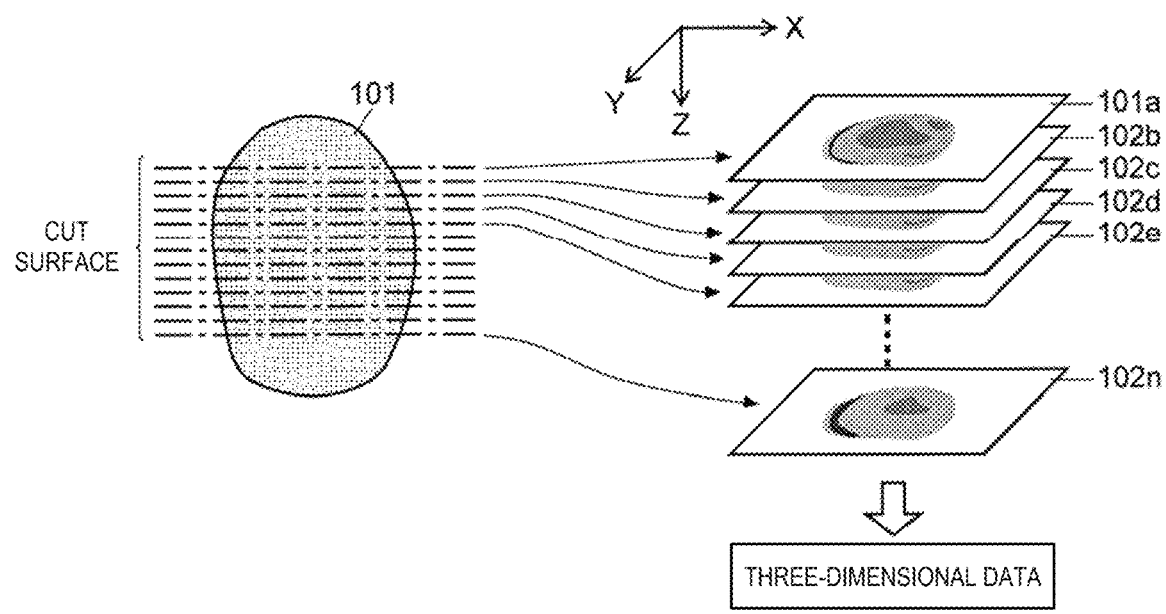
FIGS. 4A and 4B are conceptual diagrams when a three-dimensional mass spectrometry imaging graphic is created.

FIGS. 4A and 4B are conceptual diagrams of a three-dimensional MS imaging graphic. For example, as illustrated in FIG. 4A, a sample 101 such as a small piece of an organ cut out from a living body is sliced very thinly and continuously to prepare a large number of sample slices. Here, the cut surfaces of the sample slices are parallel to the X-Y plane. The measurement unit 1 measures the inside of a two-dimensional measurement region on each sample slice. As a result, as illustrated in FIG. 4B, MS imaging graphics 102a to 102n corresponding to the sample slices are obtained. By arranging the images in the Z-axis direction with the positions on the X-axis and the Y-axis aligned, it is possible to obtain substantially three-dimensional MS imaging data. Therefore, a three-dimensional MS imaging graphic is drawn on the basis of these data. The same applies to the Raman imaging graphic. By performing processing similar to that performed on the two-dimensional imaging graphics described above on these images, it is possible to obtain a result of classifying the three-dimensional MS imaging graphics and the three-dimensional Raman imaging graphics by hierarchical cluster analysis.

As described above, the imaging mass spectrometer according to the present invention can also be used for processing data extended to three dimensions.

In the above embodiment, the hierarchical cluster analysis is executed on the MS imaging graphic and the Raman imaging graphic, but instead of the Raman imaging graphic, an image by an optional imaging analysis method other than mass spectrometry imaging can be used. For example, an image by an infrared (IR) imaging method, a fluorescence imaging method, or an X-ray spectroscopic imaging method can be targeted.

In addition, it is also conceivable that both of the methods are mass spectrometry instead of two methods having completely different measurement principles such as mass spectrometry and Raman spectroscopic analysis. In this case, for example, the analysis method can be regarded as an analysis method of a type different from ordinary mass spectrometry without ion dissociation operation and MS/MS analysis or MS$^n$ analysis with ion dissociation operation. In addition, even if the sample to be analyzed itself is the same, the generated ion species may be different when the ionization method at the time of mass spectrometry is different. Therefore, here, mass spectrometry with a different ionization method can also be regarded as a different type of analysis method. For example, mass spectrometry using a MALDI method and mass spectrometry using an ionization method in a SIMS method are different types of analysis methods. Therefore, the present invention can also be applied when the imaging graphics obtained by such a different type of analysis method are collectively classified using statistical analysis such as hierarchical cluster analysis.

In addition, the above embodiment and other modifications are merely examples of the present invention, and it is a matter of course that modifications, corrections, additions, and the like appropriately made within the scope of the gist of the present invention are included in the claims of the present application.

Various embodiments of the present invention have been described above with reference to the drawings. Finally, various aspects of the present invention will be described.

According to a first aspect of the present invention, there is provided an imaging mass spectrometer that executes mass spectrometry on each of a plurality of micro areas set in a two-dimensional measurement region on a sample or a three-dimensional measurement region in a sample, the imaging mass spectrometer including:

a first imaging graphic data acquisition section configured to acquire data constituting one or a plurality of first imaging graphics indicating an ion intensity distribution at one or a plurality of specific mass-to-charge ratios or in one or a plurality of mass-to-charge ratio ranges or indicating a distribution of a calculation result obtained by predetermined calculation processing based on the ion intensity distribution based on data obtained by mass spectrometry for a target sample;

a second imaging graphic data acquisition section configured to acquire data constituting one or a plurality of second imaging graphics obtained by an analysis method that is a type different from the mass spectrometry with respect to the target sample;

a first data processor configured to perform, on data acquired by the first imaging graphic data acquisition section and the second imaging graphic data acquisition section, data conversion processing of normalizing signal intensity in the one or plurality of first imaging graphics and signal intensity in the one or plurality of second imaging graphics;

a second data processor configured to perform, on data acquired by the first imaging graphic data acquisition section and the second imaging graphic data acquisition section, data processing of aligning spatial resolutions of the one or plurality of first imaging graphics and the one or plurality of second imaging graphics; and an image classification processor configured to execute statistical analysis processing on an image for data after processing by the first and second data processor and to classify the one or plurality of first imaging graphics and the one or plurality of second imaging graphics on the basis of similarity or difference in spatial distribution.

According to the imaging mass spectrometer of the first aspect, it is possible to efficiently and objectively execute analysis processing such as similarity in intensity distribution on a mass spectrometry imaging graphic obtained by imaging mass spectrometry and an imaging graphic obtained by imaging analysis such as infrared spectroscopic analysis or Raman spectroscopic analysis completely different from mass spectrometry or imaging mass spectrometry using another ionization method in which ion species generated are different even in the same mass spectrometry. Thereby, it is possible to provide the user with useful information about a target sample which is not known or inaccurate only from analysis of the mass spectrometry imaging graphic.

In the imaging mass spectrometer of a second aspect of the present invention, in the device of the first aspect, the measurement region is a two-dimensional measurement region on a sample.

According to the imaging mass spectrometer of the second aspect, for example, for a thin sample such as a biological tissue slice, it is easy to compare distribution situations of the same component among a plurality of samples.

In the imaging mass spectrometer of a third aspect of the present invention, in the device of the first aspect, the measurement region is a three-dimensional measurement region in a sample.

According to the imaging mass spectrometer of the third aspect, for example, for a thick sample such as a biological tissue section, it is easy to compare distribution situations of the same component among a plurality of samples.

Further, in the imaging mass spectrometer of a fourth aspect of the present invention, the device of the first aspect further includes an image correction section that corrects a difference in shape of an object on an image by deforming one or both of an image based on data acquired by the first imaging graphic data acquisition section and an image based on data acquired by the second imaging graphic data acquisition section.

Image deformation processing by the image correction section can include movement, rotation, enlargement/reduction, and the like of the entire image or a part thereof. According to the imaging mass spectrometer of the second aspect, even in a case where distortion occurs in the image obtained by analysis, and the same position on the sample does not correspond between the image based on the data acquired by the first imaging graphic data acquisition section and the image based on the data acquired by the second imaging graphic data acquisition section, the images can be made comparable to each other by the image deformation processing.

Further, in the imaging mass spectrometer of a fifth aspect of the present invention, the device of the first aspect further includes a display processor that displays an image classification result by the image classification processor on a display unit in a predetermined format, and the display processor changes a visual aspect of a classification result of the first imaging graphic and a classification result of the second imaging graphic.

The visual aspect mentioned here is, for example, a display color, display brightness (luminance), shape, size, and the like. According to the imaging mass spectrometer of the third aspect of the present invention, in the classification result display of the images, the user can easily distinguish the images by different analysis methods, and the classification result can be easily understood.

In the imaging mass spectrometer of a sixth aspect of the present invention, the device of the first aspect further includes an integrated mass spectrum calculation unit that calculates and displays an integrated mass spectrum or an average mass spectrum in a specific part on a first imaging graphic set based on a classification result of an image by the image classification processor, using mass spectrum data obtained for a plurality of measurement points included in the specific part.

According to the imaging mass spectrometer of the sixth aspect, in a case where a characteristic pattern is shown on a mass spectrometry imaging graphic, an integrated mass spectrum or an average mass spectrum assumed to correspond to a component present at the specific part can be presented to a user.

REFERENCE SIGNS LIST

1 . . . Imaging Mass Spectrometry Unit
1 . . . Measurement Unit
100 . . . Sample
2 . . . Data Analyzing Unit
20 . . . MS Imaging Data Storage Section
21 . . . Raman Imaging Data Storage Section
22 . . . MS Imaging Graphic Creation Section
23 . . . Raman Imaging Graphic Creation Section
24 . . . Signal Intensity Normalization Processor
25 . . . Spatial Resolution Adjustment Processor
26 . . . Statistical Analysis Processor
27 . . . Display Processor
3 . . . Input Unit
4 . . . Display Unit
5 . . . Raman Spectroscopic Imaging Measurement Device

The invention claimed is:

1. An imaging mass spectrometer that executes mass spectrometry on each of a plurality of micro areas set in a two-dimensional measurement region on a sample or a three-dimensional measurement region in a sample, the imaging mass spectrometer comprising:

a mass spectrometry imaging graphic data acquisition section configured to acquire data constituting a plurality of first imaging graphics indicating an ion intensity distribution at one or a plurality of specific mass-to-charge ratios or in one or a plurality of mass-to-charge ratio ranges based on data obtained by mass spectrometry for a target sample;

a second imaging graphic data acquisition section configured to acquire data constituting a plurality of second imaging graphics obtained by an analysis method of a type different from the mass spectrometry with respect to the target sample;

a first data processor configured to perform, on data acquired by the mass spectrometry imaging graphic data acquisition section and the second imaging graphic data acquisition section, data conversion processing of normalizing signal intensity in the plurality of first imaging graphics and signal intensity in the plurality of second imaging graphics;

a second data processor configured to perform, on data acquired by the mass spectrometry imaging graphic data acquisition section and the second imaging graphic data acquisition section, data processing of aligning spatial resolutions of the plurality of first imaging graphics and the plurality of second imaging graphics; and an image classification processor configured to execute statistical analysis processing on images for data after processing by the first and second data processor and to classify the plurality of first imaging graphics and the plurality of second imaging graphics on a basis of similarity or difference in spatial distribution.

2. The imaging mass spectrometer according to claim 1, wherein the measurement region is a two-dimensional measurement region on a sample.

3. The imaging mass spectrometer according to claim 1, wherein the measurement region is a three-dimensional measurement region in a sample.

4. The imaging mass spectrometer according to claim 1, further comprising an image correction section that corrects a difference in shape of an object on an image by deforming one or both of an image based on data acquired by the first imaging graphic data acquisition section and an image based on data acquired by the second imaging graphic data acquisition section.

5. The imaging mass spectrometer according to claim 1, further comprising a display processor that displays an image classification result by the image classification processor on a display unit in a predetermined format,
wherein the display processor changes a visual aspect of a classification result of the first imaging graphic and a classification result of the second imaging graphic.

6. The imaging mass spectrometer according to claim 1, further comprising an integrated mass spectrum calculation unit that calculates and displays an integrated mass spectrum or an average mass spectrum in a specific part on a first imaging graphic set based on a classification result of an image by the image classification processor, using mass spectrum data obtained for a plurality of measurement points included in the specific part.

* * * * *